(12) United States Patent
Kanehara

(10) Patent No.: US 6,934,281 B2
(45) Date of Patent: Aug. 23, 2005

(54) PACKET PROCESSING APPARATUS, AND PACKET PROCESSING METHOD

(75) Inventor: Fumikazu Kanehara, Tokyo (JP)

(73) Assignee: NEC Corporation, Tokyo (JP)

( * ) Notice: Subject to any disclaimer, the term of this patent is extended or adjusted under 35 U.S.C. 154(b) by 999 days.

(21) Appl. No.: 09/731,659

(22) Filed: Dec. 8, 2000

(65) Prior Publication Data
US 2001/0003526 A1 Jun. 14, 2001

(30) Foreign Application Priority Data
Dec. 10, 1999 (JP) .......................................... 11-352111

(51) Int. Cl.⁷ .................................................. H04J 3/16
(52) U.S. Cl. ...................................... 370/353; 370/465
(58) Field of Search ................................. 370/352–356, 370/465, 466

(56) References Cited

U.S. PATENT DOCUMENTS 5,327,428 A * 7/1994 Van As et al. ............... 370/353
6,360,287 B1   3/2002 Kawamura

FOREIGN PATENT DOCUMENTS

| JP | 2-171062 A | 7/1990 |
|---|---|---|
| JP | 5-114913 A | 5/1993 |
| JP | 6-104930 A | 4/1994 |
| JP | 7-273800 A | 10/1995 |
| JP | 8-65342 A | 3/1996 |
| JP | 10-285215 A | 10/1998 |
| JP | 11-177588 A | 7/1999 |
| JP | 11-234313 | 8/1999 |
| JP | 11-234313 A | 8/1999 |
| JP | 11-275143 A | 10/1999 |
| JP | 2000-32053 A | 1/2000 |

* cited by examiner

Primary Examiner—Melvin Marcelo
(74) Attorney, Agent, or Firm—Foley & Lardner LLP

(57) ABSTRACT

There is disclosed a packet processing apparatus in which connection-oriented and connectionless data transfer systems are combined for use, and definite data transmission is secured even when a traffic load of a data transmission bus is large. An IP packet communication apparatus for using asynchronous and isochronous communication channels to perform a processing of an IP packet includes an address table for storing attribute information of the IP packet to be transmitted, each IP packet including information indicative of presence/absence of transmission in a fixed interval, a transmission monitor for periodically monitoring the information of the address table, and a CMP processor for receiving judgment information obtained by judging continuity of a traffic by the transmission monitor, and establishing the communication channel for asynchronous transmission.

17 Claims, 4 Drawing Sheets

PACKET PROCESSING APPARATUS, AND PACKET PROCESSING METHOD

BACKGROUND OF THE INVENTION i) Field of the Invention

The present invention relates to communication in which connectionless communication and connection-oriented communication are combined for use, particularly to a packet processing apparatus and packet processing method in IEEE 1394 transfer system.

ii) Description of Related Art

In recent years, an IEEE 1394 interface relating to the present invention has spread as multimedia real-time transmission between digital, video, or audio and PC. An IEEE 1394 standard is defined as "IEEE Std 1394 IEEE Standard for a High Performance Serial Bus", and in IEEE 1394 bus as a high-rate serial bus, data is divided in a packet form, and transmitted in a time division on the basis of a cycle of a length of 125 µs.

For a transmission method in the IEEE 1394, there are two methods of isochronous transmission and asynchronous transmission, and IEEE 1394 packet is transmitted as an isochronous packet and an asynchronous packet.

In the isochronous transmission, by securing a band necessary for transmission in all cycles, transmission in a fixed time is assured, an isochronous channel as communication connection is established beforehand between nodes to perform communication, and subsequently data transfer is performed in a connection-oriented communication system. Here, an identifier of the isochronous channel is called an isochronous channel number.

On the other hand, in the asynchronous transmission, in each cycle, arbitration is performed in a remaining time after the isochronous transmission, and the node having secured the bus performs data transfer. Different from the isochronous transmission, without establishing the connection beforehand, the identifier allotted univocally to the node on the bus is used to perform the data transmission in the connectionless communication system. Moreover, this identifier is called a node ID.

In this manner, the isochronous transmission corresponds to the connection-oriented communication in which a band is assured, and the asynchronous transmission corresponds to the connectionless communication in which no band is assured.

Such communication mode in which the IEEE 1394 interface is used is disclosed in the invention of Japanese Patent Application Laid-Open No. 234313/1999 relating to a multimedia exchange apparatus. The invention relates to the multimedia exchange apparatus for performing an exchange processing of communication, sound or image data, and using a high-rate serial bus of the IEEE 1394 interface standard to change a data transfer path by automatic allocation and perform the exchange processing. In this technique, various data in an inside line node apparatus and outside line node apparatus are automatically allocated to isochronous or asynchronous communication channels based on an identification code, and the like and packet transfer is performed.

In a conventional local area network (LAN), mainly Ethernet is used as a physical medium, but data transmission is the connectionless communication, and no band is assured in data transfer.

As the connection-oriented communication, ATM-LAN, and the like have been used in recent years, but all connections are established beforehand in a fixed manner between the nodes in LAN, and this disadvantageously results in remarkably laborious connection management. Moreover, when the connection is dynamically established by a signaling processing, processing overhead increases, and there is a disadvantage that a processing load in each terminal becomes heavy. For these reasons, the technique of ATM-LAN is more effectively used in the connection between LANs than within LAN.

As described above, the connection-oriented communication using ATM used in the conventional LAN and the connectionless communication represented by Ethernet are both provided with the aforementioned defects when used in LAN as they are.

On the other hand, the IEEE 1394 bus is a physical medium provided with both transfer systems of the connection-oriented and connectionless communications, and it is studied by a standardization organization or the like how to realize IP communication in the IEEE 1394 bus.

For example, with respect to Internet Protocol (IP) communication on IEEE 1394, there is a specification proposal of IP over IEEE 1394 by Internet Engineering Task Force (IETF). In this system, transmission is performed by encapsulating IP packet with an asynchronous packet, and this corresponds to the aforementioned connectionless communication.

Moreover, a method of connection-oriented communication for performing encapsulation and transmission with the isochronous packet is similarly proposed in IETF. However, both communications are provided with defects that no band is assured in the aforementioned connectionless communication, and the processing is heavy in the connection-oriented communication.

SUMMARY OF THE INVENTION

Based on the aforementioned background, in the present invention, asynchronous transmission and isochronous transmission of IEEE 1394 bus will be described as embodiments, and an object of the present invention is to propose an IP communication system in which connection-oriented communication and connectionless communication are combined for use in consideration of a communication traffic state.

According to the present invention, there is provided an IP packet processing apparatus comprising: an IEEE 1394 packet transmitter for performing transmission of an IEEE 1394 packet; an IEEE 1394 packet receiver for receiving the IEEE 1394 packet; an IP packet extractor for extracting an IP packet from the received IEEE 1394 packet; an IP packet processor for referring to a routing table set and updated by an ARP processing from the extracted IP packet, adding predetermined transfer destination information, and instructing encapsulation of the IP packet into the IEEE 1394 packet; an address table for receiving a transmission processing notice from the IEEE 1394 packet transmitter, and including attribute information indicating presence/absence of continuous transmission of the IP packet as an entry; a transmission monitor for searching the information of the address table at a fixed interval, and judging, in accordance with the searched information, whether establishment of an asynchronous channel is necessary or unnecessary with respect to a data flow; an CMP processor for obtaining a corresponding isochronous channel number and band from an establishment request of the isochronous channel transmitted from the transmission monitor, and registering the obtained channel information in the address table; and means for referring to the address table information, encapsulating the IP packet to be transmitted in the IEEE 1394 packet, and using the established communication channel to generate an isochronous packet.

Moreover, the IP packet processing apparatus of the present invention includes: an IP packet extractor for extracting port information of an IP packet to be transmitted and setting the information in an address table; and the address table further including attribute information indicating whether or not a predetermined number of transmissions of the packet for entry information are continuously performed with respect to respective entries including types of ports set by the IP packet extractor.

DETAILED DESCRIPTION OF THE PREFERRED EMBODIMENTS

An embodiment of the present invention will be described.

Figure 2:
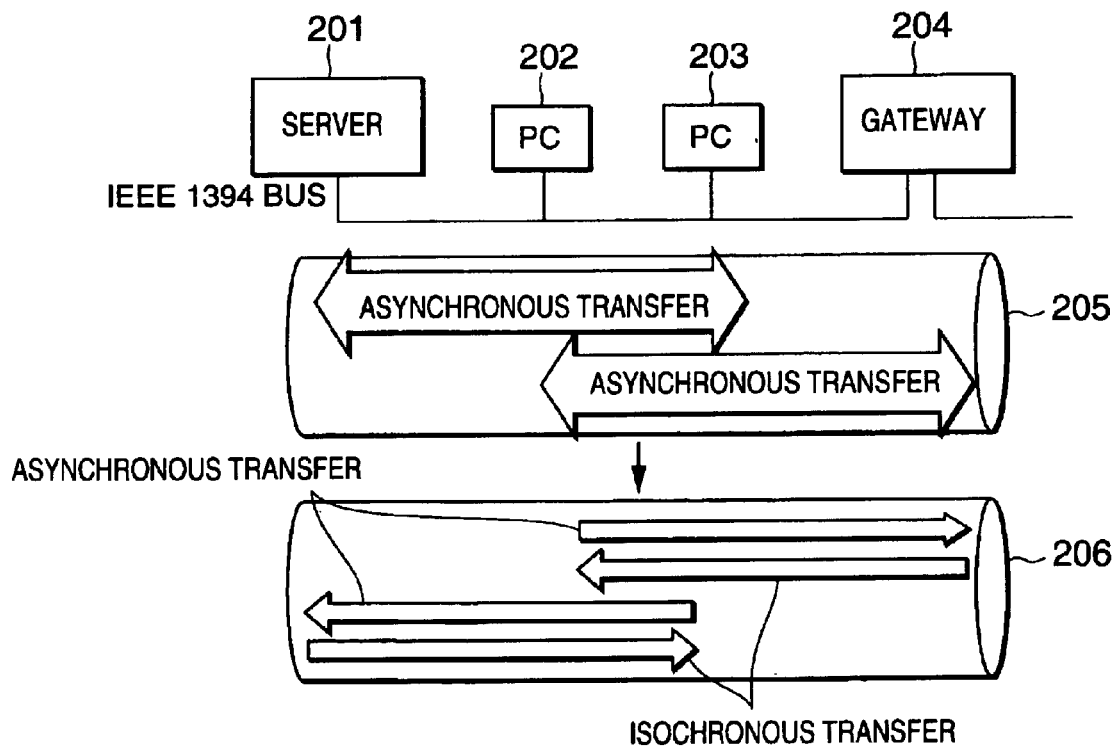
FIG. 2 is an explanatory view showing a general idea of the present invention.

First, a general idea of an IP packet processing apparatus of the present invention will be described with reference to FIG. 2. FIG. 2 is an explanatory view showing the general idea of the present invention, and shows, as one example, LAN in which a server 201, PC terminal 202, PC terminal 203 and gateway 204 are included as communication apparatuses for processing an IP packet and IP communication is performed among the respective apparatuses.

Here, a physical cable for connecting the respective apparatuses to one another is an IEEE 1394 serial bus or another bus provided with two connection-oriented and connectionless transfer systems. Moreover, the physical cable for connecting the respective apparatuses of the gateway of the LAN is an IEEE 1394 bus or another bus provided with two connection-oriented and connectionless transfer systems, and is connected to an external network via the gateway 204.

Here, as one example a case is considered in which the PC terminal 203 starts download of large-capacity data such as image data from the server 201, and the PC terminal 202 receives the image data from the external network via the gateway 204. When a plurality of data transfers are performed in connectionless communication similarly as Ethernet, mutual transfer traffic is probably influenced.

Specifically, when a plurality of data transfers are performed in asynchronous transfer as the connectionless communication in the IEEE 1394 serial bus, and the traffic of each data transfer increases, a communication band used in each data transfer probably exceeds a total band width of the bus.

In order to avoid such situations, in the present invention, there are proposed a system of monitoring a transmission situation of the IP packet in each apparatus, and changing the transmission satisfying a certain fixed condition over to connection-oriented transfer, and an apparatus provided with the system.

Specifically, the present invention is provided with a constitution for changing the connectionless IP communication over to IP communication in which connection-oriented and connectionless communications are combined for use, specifically, for changing the IP communication by asynchronous transfer over to the IP communication by isochronous transfer in accordance with a traffic state in data transfer on the IEEE 1394 serial bus.

For example, in LAN of FIG. 2, when traffics of transfer to the PC terminal 202 from the gateway 204 and data transfer to the PC terminal 203 from the server 201 are large, change-over of the transfer system from the asynchronous transfer as the connectionless communication is performed in such a manner that data transfer is performed by isochronous transfer as the connection-oriented communication with the assured band.

Figure 1:
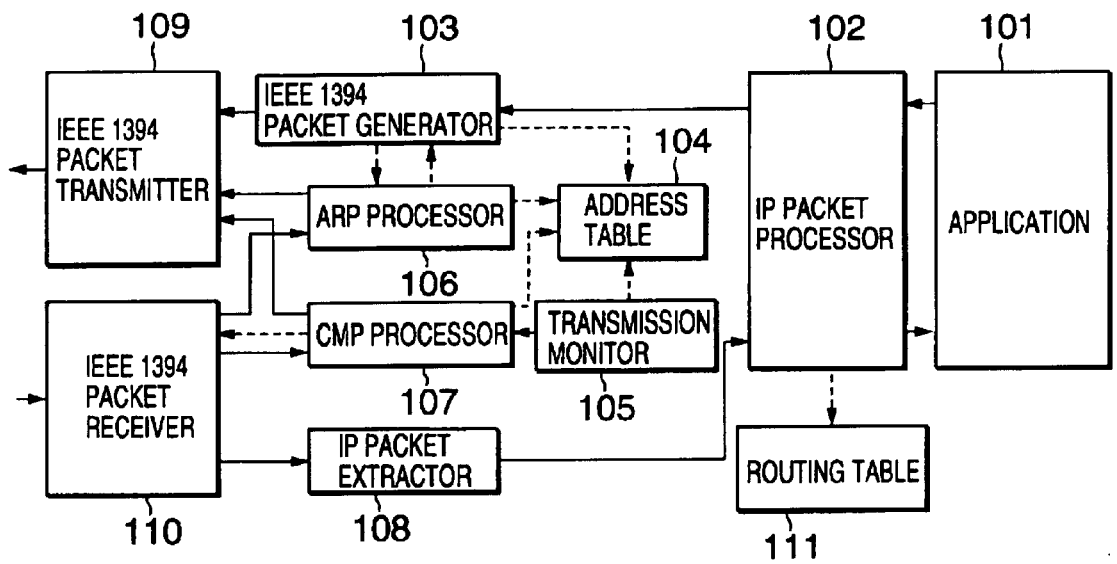
FIG. 1 is a function block diagram of an IP packet processing apparatus according to an embodiment of the present invention.

The embodiment of the present invention will next be described in detail with reference to the drawings. FIG. 1 is a function block diagram of the IP packet processing apparatus according to the embodiment of the present invention.

(1) Summary of Function Block

As shown in FIG. 1, the IP packet processing apparatus of the present invention receives the IEEE 1394 packet from the IEEE 1394 bus, extracts the IP packet from the IEEE 1394 packet, supplies the packet to an application, converts information from the application to the IP packet and further to the IEEE 1394 packet, and performs transmission to another communication terminal. Here, for the transfer of the IP packet, a transfer destination is determined based on routing table information set/updated by an address resolution protocol (ARP) processing and transmission is performed. A summary of respective function blocks of FIG. 1 will be described hereinafter.

<Application Section>

An application section 101 includes an application in which a file transfer protocol (FTP) and a real time protocol (RTP) are used, and performs data input/output with an IP packet processor 102.

<IEEE 1394 Packet Transmitter>

In response to an IEEE 1394 packet transmission request from another processor, an IEEE 1394 packet transmitter 109 sends an isochronous packet and asynchronous packet to the IEEE 1394 bus.

<IEEE 1394 Packet Receiver>

An IEEE 1394 packet receiver 110 performs a processing of distributing the packet received from the IEEE 1394 bus to another processor. With the isochronous packet, the receiver outputs the packet of an isochronous channel number requested to be opened from a connection management procedure (CMP) processor 107 described later to an IP packet extractor 108. Moreover, on receiving the packet of the isochronous channel number requested to be closed from the CMP processor 107, the receiver discards the packet.

<IP Packet Extractor>

The IP packet extractor 108 performs a processing of extracting the IP packet from the isochronous packet or the asynchronous packet inputted from the IEEE 1394 packet receiver 110. When the inputted packet data is fragmented into a plurality of asynchronous packets, a reassembly processing is performed, and the IP packet is restored and outputted to the IP packet processor 102.

<Routing Table>

A routing table 111 is provided with information for determining an IP route. Similarly as the conventional art, the table is used to determine an IP address of the node for the next transfer with respect to a transmission IP packet. Routing information stored in this routing table may be preset in a fixed manner, or may dynamically be prepared by a routing protocol.

<ARP Processor>

On receiving an address settlement request from an IEEE 1394 packet generator 103, an ARP processor 106 generates an ARP packet for obtaining node ID of the node on the IEEE 1394 bus provided with the IP address of the transfer destination, offset and max_rec value, and outputs the packet to the IEEE 1394 packet transmitter 109. Here, the offset indicates a position of an address in which IP data is written into a transfer destination node register.

With transfer of IP with IEEE 1394, asynchronous WRITE transfer is performed as shown in IETF document, but in this method by writing the IP data into the predetermined address of the transfer destination node register, data reception is substantially performed. However, since an address value for writing the data into the register is arbitrarily set for each node, it is necessary for a transferor node to know beforehand the address of the transfer destination node into which the IP data is to be written.

Moreover, max_rec indicates a data size which can be received once by a certain reception side node, and is similarly obtained from the reception side node by the ARP processing. When a transmission side node transmits data to the reception side node in this manner, data can be transmitted as the packet obtained by fragmenting the data in accordance with the data size.

When a response to the transmitted ARP packet is inputted to the ARP processor 106 via the IEEE 1394 packet receiver 110, the ARP processor 106 sets the node ID, offset, and max_rec value in the corresponding entry of an address table 104, and outputs an address settlement completion notice to the IEEE 1394 packet generator 103.

<Transmission Monitor>

A transmission monitor 105 is a processor for judging establishment and release of an isochronous channel. The monitor searches the information registered in the address table 104 at a fixed interval, monitors whether each transmission traffic identified in accordance with a transmitter, transmission destination, transfer data and other attributes lasts in a steady manner or performs a large-capacity transfer, and determines whether an establishment/release request of the isochronous channel is to be issued in accordance with the traffic state.

The search interval of the address table 104 by the transmission monitor 105 can arbitrarily be set, and is appropriately set in accordance with the type of the application handled in the LAN, the number of terminals, and the like.

<IP Packet Processor>

The IP packet processor 102 converts transmission request data from the application section 101 to the IP packet, and outputs the packet to the IEEE 1394 packet generator 103. In this case, the processor refers to the information of the routing table 111, determines the IP address of the next transfer destination node, and also notifies the IEEE 1394 packet generator 103 of IP address information.

Moreover, also with respect to the IP packet inputted from the IP packet extractor 108, the IP packet processor 102 similarly refers to the information of the routing table 111, and determines the IP address of the next transfer destination node. If the transfer destination node is a self node, the processor extracts payload information from the IP packet and outputs the information to the application section 101. Furthermore, if the transfer destination node is not the self node, the IP address of the transfer destination node, and the IP packet are outputted to the IEEE 1394 packet generator 103.

<Address Table>

The address table 104 holds attribute information of the received traffic as an entry, the entry is registered by the IEEE 1394 packet generator 103, and subsequently the entry is used as reference information for generation of the IEEE 1394 packet.

Moreover, each entry attribute information is set and updated by the ARP processor 106, transmission monitor 105 and other respective processors.

Figure 5:
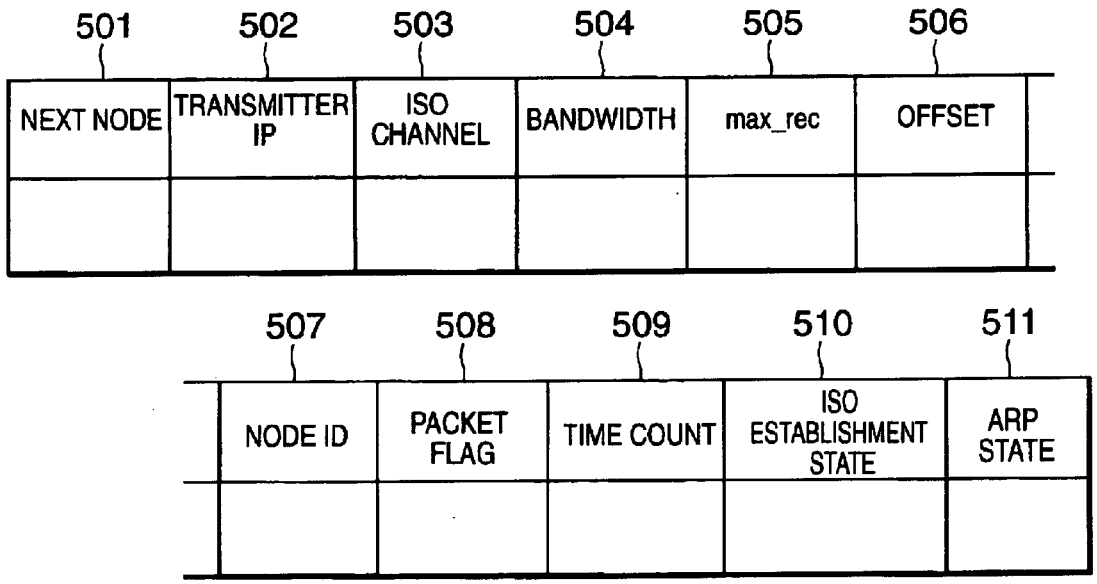
FIG. 5 shows a constitution example of an address table of the embodiment of the present invention.

FIG. 5 shows a constitution example of the address table according to the embodiment of the present invention.

The attribute information of the address table 104 will be described with reference to the drawings. Attribute "Next node" 501 indicates the IP address of the transfer destination node of the IP packet. Attribute "transmitter IP" 502 indicates the IP address of the transmitter node of the IP packet to be transferred. Attribute "ISO channel" 503 denotes an isochronous channel number. Attribute "bandwidth" 504 denotes a bandwidth allocated to the ISO channel.

Attribute "max_rec" 505 denotes the maximum size of the asynchronous packet. Attribute "offset" 506 denotes address information embedded in a header of the asynchronous packet. Attribute "node ID" 507 denotes the node ID of the transfer destination node in asynchronous transfer. Attribute "packet flag" 508 is a flag indicating whether or not the packet has recently been transmitted to Next node, 1 means that the packet has been transmitted, and 0 means that no packet has been transmitted.

Attribute "time count" 509 is a parameter indicating a packet transmission frequency and an initial value is 0. Attribute "ISO establishment state" 510 indicates an establishment state of the isochronous channel, and takes four values "non-established", "being established", "being released", and "established". Attribute "ARP state" 511 indicates the state of an address settlement processing by ARP, and takes three values "unsettled", "being settled", and "settled".

<IEEE 1394 Packet Generator>

The IEEE 1394 packet generator 103 generates the IEEE 1394 packet based on the IP address and IP packet of the transfer destination node inputted from the IP packet processor 102 and outputs the packet to the IEEE 1394 packet transmitter 109. During output, the generator searches the entry of the address table 104 as follows, and refers to entry information to determine whether the asynchronous packet or the isochronous packet is to be generated. Moreover, during output to the IEEE 1394 packet transmitter 109, the generator sets a value of the entry packet flag to 1.

<CMP Processor>

The CMP processor 107 performs a processing of establishing and releasing the isochronous channel. Here, CMP means a protocol for operating a plurality of input/output plug registers disposed on respective IEEE 1394 communication nodes, and establishing/releasing connection between the nodes with respect to the isochronous channel, and to establish the isochronous channel connection between the nodes, this includes a procedure by which a certain node requests another node to validate the channel.

With input of an isochronous channel establishment request from the transmission monitor 105, the CMP processor acquires or releases a resource from an isochronous resource manager to perform the establishment/release of the isochronous channel for use in data transfer.

Moreover, on receiving a notice of the isochronous channel number in the establishment/release of the isochronous channel from another node, the processor outputs an open/close request of the isochronous channel number to the IEEE 1394 packet receiver 110.

(2) Transfer Processing Operation

A processing operation in the embodiment of the present invention will next be described concretely. In the IP packet processing apparatus, with respect to the IP packet generated by encapsulating the transmission request data from the application section 101, or the IP packet inputted from the IP packet extractor 108, the IP packet processor 102 refers to the information of the routing table 111, determines the IP address of the transfer destination node, and performs the processing in the application when the transfer destination is the self node, or outputs the packet to the IEEE 1394 packet generator 103 when the transfer destination is another node.

The IEEE 1394 packet generator 103 generates the IEEE 1394 packet from the inputted transfer destination node IP address and IP packet, and outputs the packet to the IEEE 1394 packet transmitter 109. In this case, by referring to the corresponding entry information of the address table 104, it is determined that the asynchronous packet or the isochronous packet is to be generated. Specifically, by performing search in the address table 104 with respect to the packet, the entry is searched in which Next node value agrees with the transfer destination IP address inputted from the IP packet processor 102 and a transmitter IP value agrees with the transmitter IP address in the header of the IP packet inputted from the IP packet processor 102.

When the corresponding entry is not found, that is, when the entry is not registered in the address table, a new entry is prepared, the transfer destination IP address is set to the Next node value of the entry, the transmitter IP address is set to the transmitter IP value, and the ARP state value is set to "being settled". Thereafter, when the address settlement request is issued to the ARP processor 106, and an address settlement processing ends in the ARP processor 106, the generator receives the completion notice from the ARP processor 106, and searches the entry again. Since the target entry is added by the ARP processing, the ARP state indicates "settled", and the compatible entry is next detected.

When the compatible entry is found in the address table, and the value of ISO establishment state fails to indicate "established", transfer is performed with connectionless asynchronous transfer. Concretely, the corresponding asynchronous packet is generated from the offset value and node ID value with respect to the entry stored in the address table 104. In this case, a fragment processing is performed in accordance with the value of max_rec. The IP packet transfer processing in the asynchronous transfer is the same as the transfer system proposed in IETF.

Moreover, when the compatible entry of the traffic is found in the address table 104, and the ISO establishment state value of the entry indicates "established", the IEEE 1394 packet generator 103 uses an ISO channel value stored in the corresponding entry, performs the fragment processing in accordance with a bandwidth value, and generates the isochronous packet.

On the other hand, the transmission monitor 105 refers to the address table 104 at a fixed period, judges whether the establishment or release of the isochronous channel needs to be performed, issues ISO establishment/release request, and sets the ISO establishment state 510 with respect to the corresponding entry of the address table 104. The transmission monitor 105 searches the information registered in the address table 104 at a fixed interval, and performs a processing shown in a processing flowchart of FIG. 3 or 4 when the ISO establishment state 510 indicates "non-established" or "established".

Figure 3:
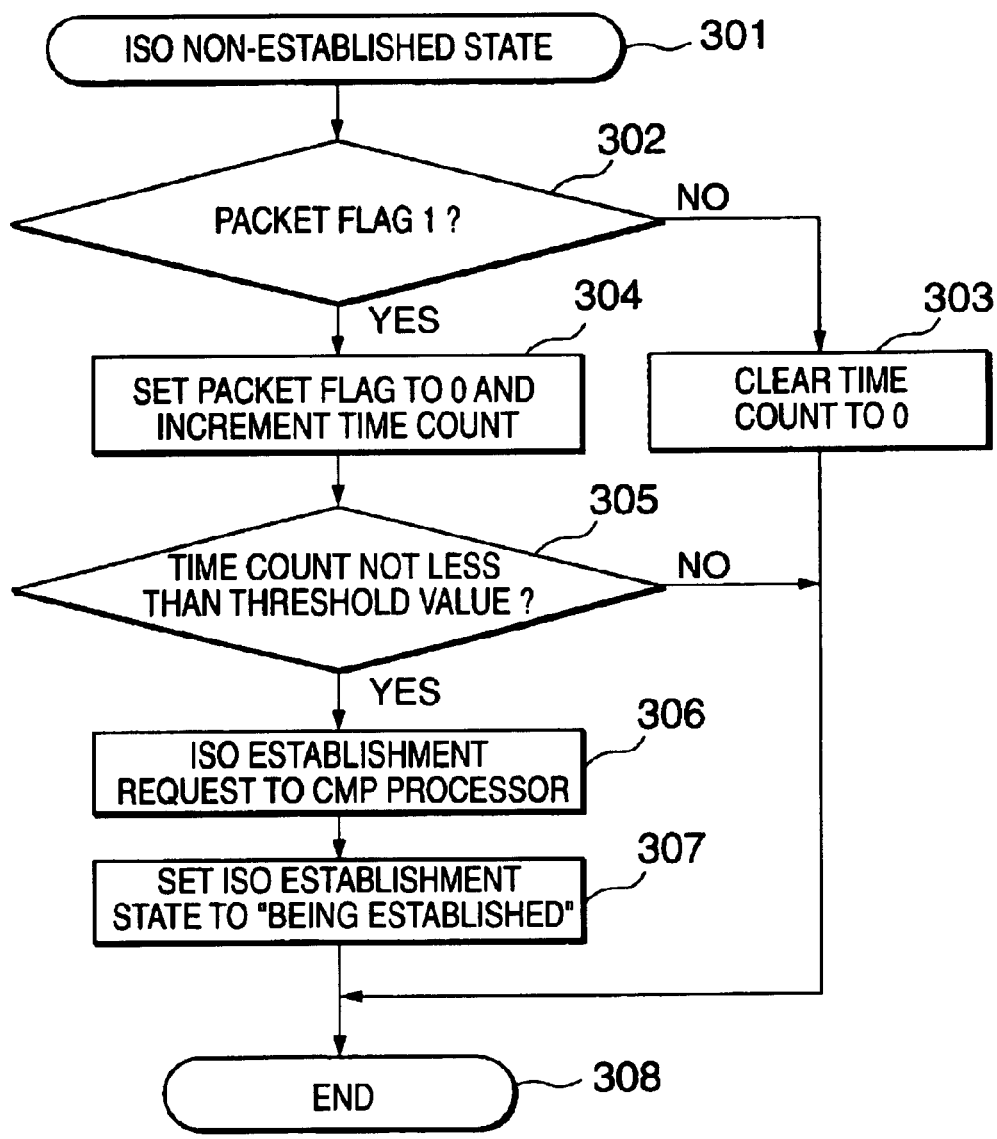
FIG. 3 is a processing flowchart showing an operation of a transmission monitor in an ISO non-established state according to the embodiment of the present invention.
Figure 4:
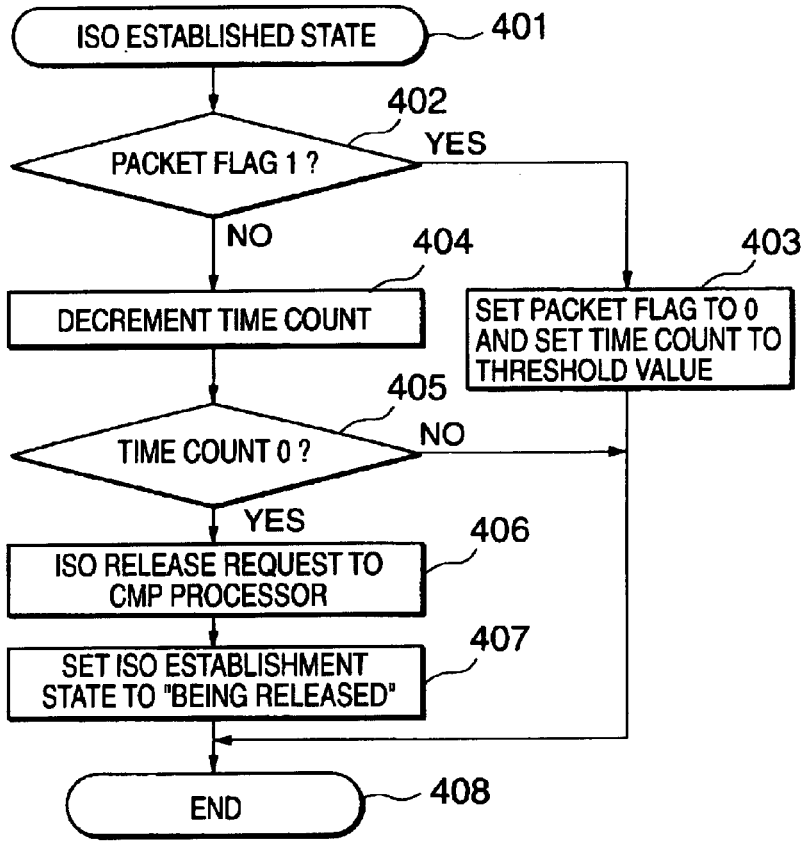
FIG. 4 is a processing flowchart showing the operation of the transmission monitor in an ISO established state according to the embodiment of the present invention.

FIG. 3 is a processing flowchart showing the operation of the transmission monitor in the ISO non-established state of the embodiment of the present invention. FIG. 4 is a processing flowchart showing the operation of the transmission monitor in the ISO established state of the embodiment of the present invention.

First, when the ISO establishment state value of the entry stored in the address table 104 indicates "non-established", the processing operation for the ISO non-established state starts (step 301), first the value of the packet flag 508 indicating whether or not the packet has recently been transmitted is checked with respect to Next node as the entry information in the address table (step 302), and the time count value is cleared to 0 and the processing ends when the packet flag value is 0, that is, when no packet is transmitted during the search interval (step 303). Specifically, the traffic load is little, the connection-oriented isochronous channel transfer is now unnecessary, and the asynchronous transfer as the usual connectionless communication is continued.

When the value of the packet flag 508 is 1, that is, when there is at least one traffic packet transmission processing in the search interval, in order to reset the packet flag value, the value is set again to 0 and 1 is added to the time count value (step 304).

It is next checked whether the time count value is not less than a fixed threshold value (step 305), the processing ends when the value is less than the fixed threshold value, and during the next search of the address table 104, it is again checked whether the packet transmission is performed in the search interval by monitoring the packet flag value. On the other hand, when the value is not less than the fixed threshold value of the ISO establishment state, it is judged that the transmission packet regarding the entry lasts in the steady manner, or that large-capacity transfer is performed, and the isochronous channel establishment request is issued to the CMP processor 107 (step 306). Thereafter, the value of the ISO establishment state 510 of the entry stored in the address table 104 is set to "being established" (step 307), and the processing ends (step 308).

The operation of the transmission monitor 105 when the entry is in the ISO established state will next be described. First, when the value of the ISO establishment state 510 of the corresponding entry of the address table 104 indicates "established" (step 401), the processing operation in the ISO established state is started. First, the value of the packet flag 508 of the entry is checked (step 402). When the value is 1, the packet flag value is set to 0, the value of the time count 509 is set to the threshold value to end the processing (step 403). When the value of the packet flag 508 is 0, 1 is subtracted from the value of the time count 509 (step 404).

It is next checked whether the value of the time count 509 is 0 (step 405). When the value is other than 0, the processing ends, and again during the search, monitoring of the packet flag value and checking of the time count value are performed. Moreover, when the time count value is 0, it is judged that there is no transmission packet regarding the entry, or that frequency decreases, the isochronous channel release request is issued to the CMP processor 107 (step 406), subsequently the ISO establishment state value is set to "being released" (step 407), and the processing ends (step 408).

When the entry ISO establishment state value indicates "being established" or "being released", nothing is performed.

When the transmission load is high in this manner, and when the transmission monitor 105 refers to the packet flag value of the address table 104, 1 is set with a high frequency, and the transmission traffic is therefore handed with isochronous transmission.

The operation of the CMP processor 107 will next be described.

The CMP processor 107 performs an establishment and release processing of the isochronous channel based on the request transmitted from the transmission monitor 105.

When the isochronous channel establishment request is inputted from the transmission monitor 105, the predetermined bandwidth and arbitrary isochronous channel number are acquired. This acquirement processing is as determined in the specification of IEEE 1394, and the processing is performed by issuing the request to the isochronous resource manager.

When the acquirement of the bandwidth and isochronous channel number is successful, the node indicated by the node ID of the corresponding entry of the address table is notified of the isochronous channel number. This is performed by outputting an asynchronous packet transmission request to the IEEE 1394 packet transmitter 109.

When notifying of the isochronous channel number is completed, the values of the ISO channel and bandwidth of the address table 104 are set. Moreover, the ISO establishment state value is set to "established".

On the other hand, when the isochronous channel release request is inputted from the transmission monitor 105, the release of the resource indicated by the bandwidth and ISO channel values of the address table 104 is performed with respect to the isochronous resource manager.

When the resource release is successful, the node indicated by the entry node ID of the address table 104 is notified of the release of the isochronous channel number. This is performed by outputting the asynchronous packet transmission request to the IEEE 1394 packet transmitter 109. When the isochronous channel number release notice is completed, the value of the ISO establishment state 510 is set to "non-established". The operation of the CMP processor 107 with respect to the request from the transmission monitor 105 has been described above.

The operation with respect to the input from the IEEE 1394 packet receiver 110 will next be described. First, the CMP processor 107 receives a notice of the isochronous channel number in the establishment of the isochronous channel from another node via the IEEE 1394 packet receiver 110. After reception, an isochronous channel number open request is outputted to the IEEE 1394 packet receiver 110.

Moreover, the notice of the isochronous channel number in the isochronous channel release from another node is also received via the IEEE 1394 packet receiver 110. After reception, an isochronous channel number close request is outputted to the IEEE 1394 packet receiver 110.

As described above, when the transmission load is higher than a fixed standard by the transmission monitor 105, establishment of the isochronous channel to a reception node from a transmission node is performed, and thereafter the IP packet is transferred with isochronous transmission as long as the transmission load satisfies the fixed standard.

Moreover, when the reception node receives the isochronous channel establishment request from the transmission node, the isochronous packet of the isochronous channel number is received.

The monitoring of the transmission load by the transmission monitor 105 is performed not by the Next node alone but by a combination unit with the transmitter IP. This is necessary when an IP packet routing transfer is performed not via the application section 101 as in the gateway 204.

Another embodiment of the present invention will next be described.

Figure 6:
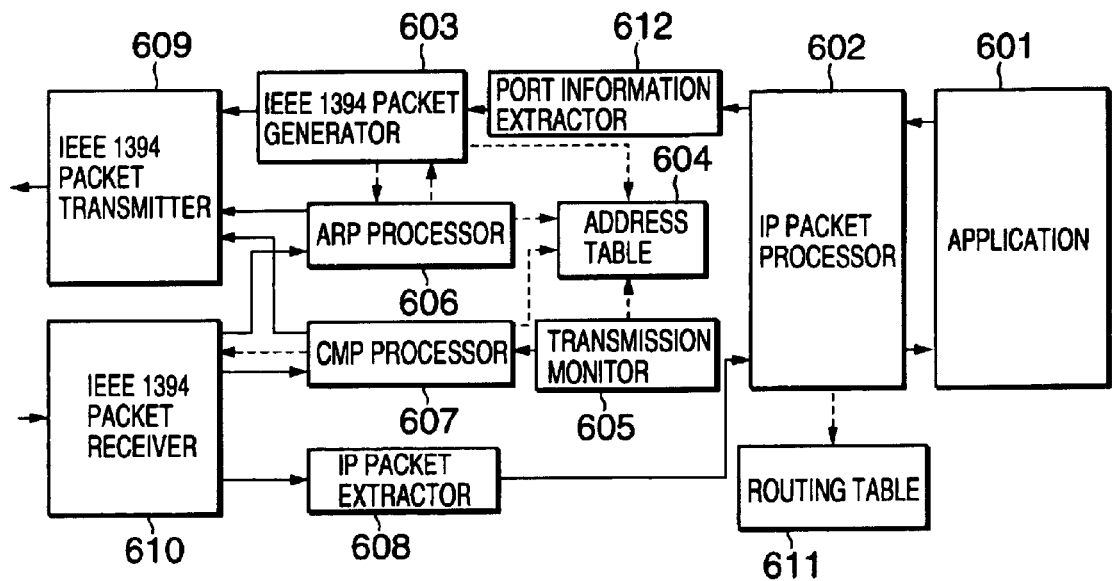
FIG. 6 is a function block diagram of the IP packet processing apparatus according to another embodiment of the present invention.

FIG. 6 is a function block diagram of the IP packet processing apparatus in another embodiment of the present invention. In the embodiment of FIG. 2, the isochronous channel is established by an inter-node unit. Specifically, in this case, the isochronous channel which can be established between the nodes is unidirectional and therefore up to one channel. In this another embodiment constitution, the isochronous channel can be established for each session. In this case, since the isochronous channel able to be established between the nodes is unidirectional, establishment is possible with respect to a plurality of sessions.

Figure 7:
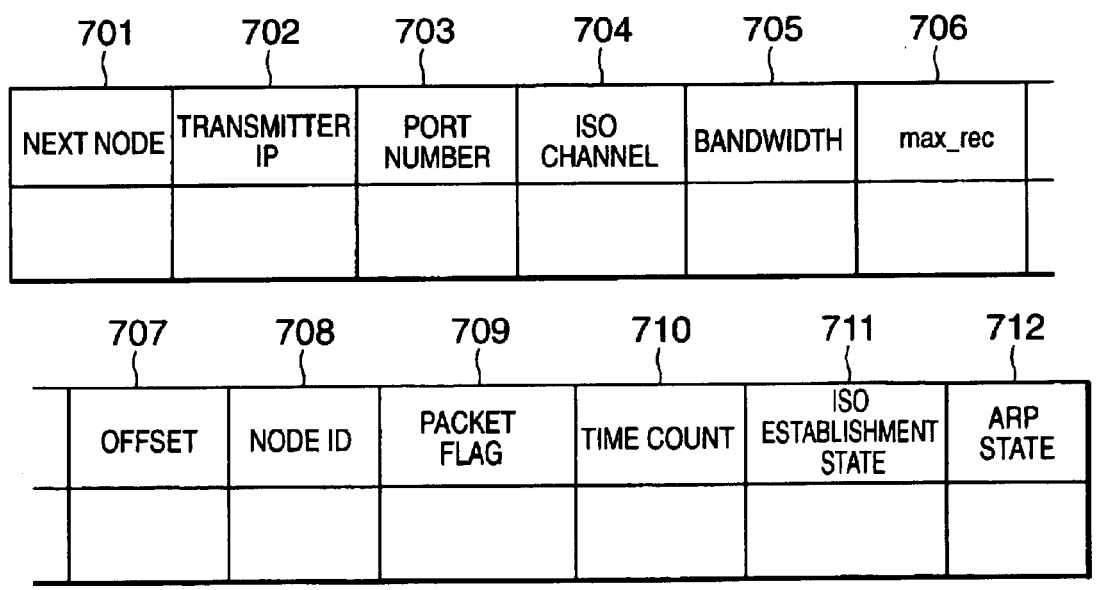
FIG. 7 shows the constitution example of the address table of another embodiment of the present invention.

The present embodiment is different from the constitution of FIG. 2 in an added port information extractor 612 and a changed constitution of an address table 604. The constitution of the address table 604 is shown in FIG. 7.

The port information extractor 612 analyzes the IP packet outputted from an IP packet processor 602, and extracts a transmission destination port number when payload is TCP or UDP. When the IP packet is fragmented, with respect to the IP packets other than the head IP packet, no port number extraction is performed.

After extracting the port number, the port information extractor 612 outputs the IP packet, transfer destination IP address, and transmission destination port number to an IEEE 1394 packet generator 603.

The processing of the IEEE 1394 packet generator 603 is the same as that of the aforementioned embodiment, but is different in that during searching of the address table 604, as an added condition, a transmission destination port (FIG. 7) value of the address table 604 agrees with the transmission destination port number inputted from the port information extractor 612.

As described above, this embodiment indicates that the isochronous channel is established by TCP or UDP session unit.

The present invention is provided with the following effects.

(1) With respect to the large-capacity data transfer or steady data transfer like a real time stream, the band can be assured by performing isochronous transfer. This band assurance means that data transfer quality is assured and another communication quality fails to be deteriorated.

(2) Since the connection for the isochronous transfer is dynamically established, it is unnecessary to establish the connection among all the nodes beforehand.

(3) With respect to small-capacity data transfer, or unsteady data transfer, by performing asynchronous transfer, overhead of a connection establishing procedure can be omitted and efficient data transfer is possible.

(4) In the application of a level higher than the level of IP layer, it is unnecessary to be conscious of transfer with asynchronous transmission or isochronous transmission.

What is claimed is:

1. A packet processing apparatus for using connection-oriented and connectionless communication channels to perform communication, said packet processing apparatus comprising:

units for using the connectionless communication channel to perform data transfer;
 judgment units for observing data transferred using the connectionless communication channel, and judging whether or not a data flow is continuous; and
 units for changing the communication channel of the data flow over to connection-oriented data transfer when it is judged that said data flow is continuous for a predetermined time.

2. The packet processing apparatus according to claim 1, further comprising units for changing the data flow communication channel back to connectionless data transfer when said judgment units judges that said data flow is not continuous for the predetermined time.

3. The packet processing apparatus according to claim 2, for using asynchronous and isochronous communication channels to perform a processing of an IP packet, and using an IIEEE 1394 serial bus to perform multimedia data transfer, said packet processing apparatus further comprising:

units for using the asynchronous communication channel to perform the data transfer with respect to the IP packet to be transmitted to another communication node during reception from another communication node, or in response to occurrence of a request of an application mounted on the packet processing apparatus itself; judgment units for periodically observing data transferred using the asynchronous communication channel, and judging whether or not the data flow is continuous for a fixed time; and
 units for changing the data flow communication channel over to isochronous data transfer when it is judged that said data flow is continuous for the fixed time.

4. The packet processing apparatus according to claim 3, further comprising:

an ARP processor for performing an ARP processing;
 an address table for storing information of the IP packet to be subjected to a transmission processing as entry information by the communication node by the ARP processing;
 a transmission monitor for periodically observing a content of said address table, observing whether the data flow belonging to the packet subjected to the transmission processing is continued for the fixed time, and determining, in accordance with the observation result, whether or not an isochronous channel is to be established;
 a CMP processor for setting the connection-oriented communication channel based on the information determined by the transmission monitor, and registering the communication channel information into said address table; and
 an IEEE 1394 packet generator for judging, based on the information stored in the address table, whether the IP packet to be transmitted is generated as an isochronous packet or an asynchronous packet, and generating an IEEE 1394 packet.

5. The packet processing apparatus according to claim 4 wherein said transmission monitor comprises: units for initializing a packet flag of the address table to set to predetermined value every time a processing of searching the address table is performed at a predetermined time interval; and units for initializing a counter value for the entry when the packet flag of the entry of said address table remains to be said value in the next search processing.

6. The packet processing apparatus according to claim 5, further comprising: an IEEE 1394 packet transmitter for transmitting the IEEE 1394 packet; an IEEE 1394 packet receiver for receiving the IEEE 1394 packet; an IP packet extractor for extracting the IP packet from the received IEEE 1394 packet; an IP packet processor for referring to a routing table set/updated by the ARP processing from the extracted IP packet, adding predetermined transfer destination information, and instructing encapsulation of the IP packet into the IEEE 1394 packet; an address table for receiving a transmission processing notice from said IEEE 1394 packet transmitter, and including attribute information indicating presence/absence of continuous transmission of the IP packet as the entry; a transmission monitor for searching the information of said address table at a fixed interval, and judging, in accordance with the searched information, whether establishment of an asynchronous channel is necessary or unnecessary with respect to the data flow; a CMP processor for obtaining a corresponding isochronous channel number, and a band from an isochronous channel establishment request transmitted from said transmission monitor, and registering the obtained channel information into said address table; and means for referring to the information of said address table to encapsulate the IP packet to be transmitted in the IEEE 1394 packet, and using said established communication channel to generate the isochronous packet.

7. The packet processing apparatus according to claim 6, further comprising:

units for extracting port information of the IP packet to be transmitted, and setting the information in the address table; and
 units for judging whether a predetermined number of transmissions of the packet for entry information are continuously performed with respect to respective entries including the set port type in said address table.

8. A network constituted by connecting the packet processing apparatus according to claim 1.

9. A packet processing method for using connection-oriented and connectionless communication channels to perform a packet processing, said packet processing method comprising steps of:

using the connectionless communication channel to perform data transfer;
 observing data transferred using said connectionless communication channel, and judging whether or not a data flow is continuous for a predetermined time; and
 changing the communication channel of the data flow over to connection-oriented data transfer when it is judged that said data flow is continuous for the predetermined time.

10. The packet processing method according to claim 9, further comprising a change-back step of changing the data flow communication channel back to connectionless data transfer when said judgment step judges that said data flow is not continuously transmitted for the predetermined time.

11. The packet processing method according to claim 10 for using asynchronous and isocbronous conununication channels to perform a processing of an IP packet and using an IEEE 1394 serial bus to perform multimedia data transfer, said packet processing method further comprising steps of:

using the asynchronous communication channel to perform the data transfer with respect to the IP packet to be transmitted to another communication node during reception from another communication node, or in response to occurrence of a request of an application mounted on a self communication node;

periodically observing data transferred using the asynchronous communication channel, and judging whether or not the data flow is continuous for a fixed time; and changing the data flow communication channel over to isochronous data transfer when it is judged that said data flow is continuous for the fixed time.

12. The packet processing method according to claim 11, further comprising:

a step of performing an ARP processing; and an address table registering step of registering packet information to be subjected to transmission by the ARP processing step;

a transmission monitor step of periodically observing a content of said address table, observing by said observing step whether the data flow belonging to the packet subjected to the transmission processing is continued for the fixed time, and determining, in accordance with the observation result, whether an isochronous channel is to be established;

a processing step or setting the connection-oriented communication channel based on the information determined by the transmission monitor step, and registering the communication channel information into said address table; and a packet generating step of for judging, based on the information stored in the address table, whether the IP packet to be transmitted is generated as an isochronous packet or an asynchronous packet, and generating a packet.

13. The packet processing method according to claim 12, provided with a step of using asynchronous and isochronous communication channels to perform a processing of an IP packet, using an IEEE 1394 serial bus to perform multimedia data transfer, and referring to a routing table for storing routing information of a network obtained by an ARP processing to transmit the IP packet to be transmitted to another communication node to a predetermined transfer destination, said packet processing method further comprising:

an IEEE 1394 packet generating step of determining, based on information stored in an address table, whether an isochronous packet or an asynchronous packet is to be generated, and generating an IEEE 1394 packet;

a registering step of registering the information obtained by performing the ARP processing as one entry in the routing table and the address table when the information of the IP packet to be transmitted is not registered in said address table;

a step of searching the address table at a predetermined time interval, and setting a packet flag indicating whether or not packet transmission is performed during searching of the address table, and a count value indicating the number of continuously observed transmissions of the packet belonging to the data flow; and a transmission step of establishing a connection-oriented communication channel with respect to the data flow when it is judged, in accordance with the information of said address table, that the transmission of the packet belonging to the data flow is performed in the predetermined observation interval and the predetermined number of observed transmissions are continuously performed, and using the established connection-oriented communication channel to encapsulate the IP packet in the corresponding connection-oriented IEEE 1394 packet and perform the transmission.

14. The packet processing method according to claim 12 wherein said transmission observing step comprises steps of:

initializing a packet flag of the address table to set to predetermined value every time the processing of searching the address table is performed at a predetermined time interval; and initializing a counter value for the entry when the packet flag of the entry of said address table remains to be said value in the next search processing.

15. A packet processing apparatus for using connection-oriented and connectionless communication channels to perform communication, said packet processing apparatus comprising:

means for using the connectionless communication channel to perform data transfer;

judgment means for observing data transferred using the connectionless communication channel, and judging whether or not a data flow is continuous; and means for changing the communication channel of the data flow over to connection-oriented data transfer when it is judged that said data flow is continuous for a predetermined time.

16. The packet processing apparatus according to claim 15, further comprising means for changing the data flow conununication channel back to connectionless data transfer when said judgment means judges that said data flow is not continuous for the predetermined time.

17. The packet processing apparatus according to claim 16 for using asynchronous and isochronous communication channels to perform a processing of an IP packet, and using an IEEE 1394 serial bus to perform multimedia data transfer, said packet processing apparatus further comprising:

means for using the asynchronous communication channel to perform the data transfer with respect to the IP packet to be transmitted to another communication node during reception from another communication node, or in response to occurrence of a request of an application mounted on a self communication node;

judgment means for periodically observing data transferred using the asynchronous communication channel, and judging whether or not the data flow is continuous for a fixed time; and means for changing the data flow coniinunication channel over to isochronous data transfer when it is judged that said data flow is continuous for the fixed time.

* * * * *